US 11,652,850 B2

United States Patent
Tannu et al.

(10) Patent No.: US 11,652,850 B2
(45) Date of Patent: *May 16, 2023

(54) SYSTEM FOR REAL TIME FEDERATION OF FILE PERMISSIONS FOR DIGITAL CONTENT PROTECTION

(71) Applicant: Seclore Technology Pvt Ltd., Mumbai (IN)

(72) Inventors: Abhijit Tannu, Mumbai (IN); Manjul Kubde, Mumbai (IN)

(73) Assignee: Seclore Technology Private Limited, Mumbai (IN)

( * ) Notice: Subject to any disclaimer, the term of this patent is extended or adjusted under 35 U.S.C. 154(b) by 79 days.

This patent is subject to a terminal disclaimer.

(21) Appl. No.: 17/235,778

(22) Filed: Apr. 20, 2021

(65) Prior Publication Data

US 2021/0243231 A1    Aug. 5, 2021

Related U.S. Application Data

(63) Continuation of application No. 15/467,635, filed on Mar. 23, 2017, now Pat. No. 10,986,132.

(30) Foreign Application Priority Data

Jan. 27, 2017    (IN) .............................. 201721003032

(51) Int. Cl.
*H04L 9/40*    (2022.01)
*G06F 21/60*   (2013.01)

(52) U.S. Cl.
CPC ............ *H04L 63/20* (2013.01); *G06F 21/604* (2013.01); *H04L 63/102* (2013.01); *G06F 2221/2115* (2013.01)

(58) Field of Classification Search
CPC ..... H04L 63/20; H04L 63/102; G06F 21/604; G06F 2221/2115
See application file for complete search history.

(56) References Cited

U.S. PATENT DOCUMENTS 9,280,773 B1 * 3/2016 Evans ................ G06Q 20/4014
10,986,132 B2  4/2021 Tannu et al.
(Continued)

OTHER PUBLICATIONS

U.S. Appl. No. 15/467,635 Final Office Action dated Feb. 13, 2019, 10 pages.

(Continued)

*Primary Examiner* — Noura Zoubair
*Assistant Examiner* — Zoha Piyadehghibi Tafaghodi
(74) *Attorney, Agent, or Firm* — Kwan & Olynick LLP

(57) ABSTRACT

A system for real time federation of file permissions for digital content protection is described. The system automatically protects the files as the files leave application boundaries and then ensures that the files can only be used as per the permissions defined on those files while they were inside the application. The system also provides real time federation of policies with the application that generated the file and automatic protection of files as the files leave the application boundary. The system thus creates a single integral platform that is easy to access as well as reliable, and provides ease-of-use, advanced technology, and connectivity that delivers automated file protection.

15 Claims, 6 Drawing Sheets

(56) References Cited

U.S. PATENT DOCUMENTS

| | | | |
|---|---|---|---|
| 2006/0010500 A1* | 1/2006 | Elazar | H04L 63/0428 726/27 |
| 2007/0162749 A1* | 7/2007 | Lim | H04L 63/20 713/167 |
| 2010/0241711 A1* | 9/2010 | Ansari | H04L 63/10 709/205 |
| 2015/0286837 A1* | 10/2015 | Baentsch | G06F 21/6218 707/783 |
| 2016/0381054 A1* | 12/2016 | Agaian | H04L 63/1408 726/23 |
| 2018/0189461 A1* | 7/2018 | Ghafourifar | H04N 21/631 |

OTHER PUBLICATIONS

U.S. Appl. No. 15/467,635 Final Office Action dated Jun. 10, 2020, 10 pages.
U.S. Appl. No. 15/467,635 Non-Final Office Action dated Aug. 24, 2018, 10 pages.
U.S. Appl. No. 15/467,635 Non-Final Office Action dated Aug. 28, 2019, 9 pages.
U.S. Appl. No. 15/467,635, Office Action Appendix, Aug. 31, 2020, 2 pgs.
U.S. Appl. No. 15/467,635 Notice of Allowance dated Dec. 23, 2020, 7 pgs.

\* cited by examiner

SYSTEM FOR REAL TIME FEDERATION OF FILE PERMISSIONS FOR DIGITAL CONTENT PROTECTION

CROSS-REFERENCE TO RELATED APPLICATION

The present application is a continuation of U.S. patent application Ser. No. 15/467,635 filed on Mar. 23, 2017, and entitled SYSTEM FOR REAL TIME FEDERATION OF FILE PERMISSIONS FOR DIGITAL CONTENT PROTECTION, which claims priority to Indian Patent Application Serial No. 201721003032, filed Jan. 27, 2017, all of which are incorporated herein by reference in their entirety.

FIELD OF THE INVENTION

The present invention relates to a system for real time federation of file permissions for digital content protection. More particularly, it relates to a system that automatically protect the file(s) as they leave application or enterprise system boundaries and ensures that the file(s) can only be accessed anywhere in the world as per the permissions defined on that information, document or file while it was inside the application. More particularly, it relates to a system that provides real time federation of policies with the application that generated the file and automatic protection of file(s) as the file(s) leave the application or enterprise system boundary.

More particularly, the present invention relates to the creation of a single integral platform that can be used to protect information from multiple and/or different applications vis-a-vis is easy to access and reliable.

BACKGROUND OF THE INVENTION

Conventional enterprise systems (ES) are large-scale application software packages that support business processes, information flows, reporting, and data analytics in complex organizations. While ES are generally, packaged-enterprise application software (PEAS) systems they can also be bespoke, custom developed systems created to support a specific organization's needs. These systems are typically designed to provide high levels of transaction performance and data security.

ES creates, stores or shares document(s) or file(s), and protect this information while they are within the system. There are access permissions defined for the information within ES that allows certain identified users certain level of access on the information. The permissions defined for this information can no longer be enforced, once it is downloaded in the form of files and leave the boundary of the respective application or ES.

Another issue related with such system is that, there are file/document centric permissions, therefore it is tedious to manage who and how these permissions would be defined for each document. In addition, as the document traverse through different systems and escalates through regular business workflow, these permissions need to be modified regularly, consequentially managing and maintaining these permissions on each document becomes almost impossible task.

Most of these documents are generated, stored and shared through various known enterprise applications like SharePoint, Box, email servers, SAP, BI Tools, enterprise file shares, etc. These enterprise applications already have policies and permissions defined for respective file(s).

No ES currently enforce the application permissions on the file(s) once the file(s) leaves the application. They rely on other ES to take over the responsibility of securing the file. In this case, the other system has its own policies. In most cases, enterprises just rely on user's discretion to take care of the security of the file.

Some of the rights management systems secure the files as they leave the application or ES boundaries. However, they expect the users or administrators of the rights management system to re-define the policies for the file or they do one-time sync of the current permissions on the file. This is cumbersome and ineffective, as the permissions on the file do need to change as the file flows through different workflows.

Thus, relying on different systems to take care of the document security, each having its own policies, leads to policy chaos. Many a times, these policies are not in harmony, consequentially it often leaves gaps where the files are not protected by any of these security systems.

Another drawback is that, perennially relying on end user's discretion leads to weak security, as user(s) remains the weakest link in any security system. Resultant situation would mean diminutive or no security once the file leaves the application or ES.

In cases where the user or administrator must re-define the policies for each document, it becomes an administrative burden to define and manage these policies, rendering the entire process difficult and cumbersome. Usually, this is done for a class of documents, e.g., all appraisal documents have a policy or all documents in given folder have a policy. This leads to problems because different documents in the folder may be at different stages of business workflow (e.g., one appraisal may be at initial stage while other may be at approval stage); therefore, the permissions required on each document necessitates to be different and generic approach can't be taken for all of them.

While in cases, where systems do one-time sync of policies with any respective application, there is a challenge of keeping the access permissions on file(s) up to date as these files traverse through different business workflow. In addition, these systems derive these permissions from such respective enterprise applications that are used to store and share the file. For example, a document may be downloaded from Box and the hence permissions are derived from Box; however, it may also be shared over email with other users. If this is not captured while deriving permissions on the file, the new set of users will not be able to use the file.

Thus, there is a requirement of such system that can overcome the above limitations and provide extended security to the file(s) even after the file(s) leave the boundary of the application.

OBJECTS OF THE INVENTION

To eliminate these collective problems listed above, the present invention proposes a system and a method to overcome the above limitations. The present invention focuses to a system for real time federation of file permissions for digital content protection. The system of the present invention shall automatically protect the file(s) as they leave application or ES boundaries and then ensures that the file(s) can only be used as per the access permissions defined on those files while they were inside the respective application.

The primary objective of the present invention is to provide a system for real time federation of file permissions for digital content protection.

Another object of the present invention is to provide a system that automatically protects the file(s) as file(s) leave application boundaries and then ensures that the file(s) can only be used as per the access permissions defined on those files while they were inside the application.

Another object of the present invention is creation of a single integral platform that is reliable, easy to access while it also provide connectivity, ease-of-use and advanced technology to sync security with multiple platforms that will deliver automated file protection.

Yet another object of the present invention is to provide a system that ensures the file remains secured and can only be used by users who are permitted to use it while it was inside the application.

Yet another object of the present invention is to provide a system, wherein real-time federation of policies with the application that generated the file, when the file is used by any user ensures, that the permissions on the file always reflects the current permissions on the file as per the new business scenario and the stage of the document in the business workflow.

Yet another object of the present invention is to provide a system wherein requirement for manually defining the policies can be avoided and/or the system itself can federate policies from multiple applications simultaneously allowing the applications to automatically derive permissions on the file at any point of time.

Yet another object of the present invention is to create a system wherein set of web services (end-point) for policy federation is implemented as an independent component and questions application while the system of the present invention requests for file permission.

Yet another object of the present invention is to create a system wherein set of web services (end-point) for policy federation can alternatively be implemented by the external application itself, wherein when the server of the system of the present invention requests the file permission, it just returns the same.

SUMMARY OF THE INVENTION

Before the present invention is described, it is to be understood that present invention is not limited to particular methodologies and materials described, as these may vary as per the person skilled in the art. It is to be understood that, the terminology used in the description is for describing the particular embodiments only, and is not intended to limit the scope of the present invention.

According to the present invention, the solution envisioned through this embodiment is to provide a system for real time federation of file(s) permissions for digital content protection. The digital content includes various media, audio, audio-visual, images, software and textual contents. Such content is stored in various application, PEAS or ES in the form of information and are protected under the application norms. There are cases when the information is not stored in form of files when it is inside the application instead it is stored as information in some database tables or it may get converted into a file when the user downloads that information (e.g., when user downloads a report from SAP, inside SAP it is not stored as a file but it becomes a report file when user downloads it).

The system of the present invention provides protection to file(s) as file(s) leave the application or ES boundaries and then ensures that the files can only be used as per the access permissions defined on those files while they were inside the application or PEAS. Thus, creating a single integral platform, that is easy to access as well as reliable, and provides ease-of-use, advanced technology, connectivity that delivers automated file protection. The system of the present invention ensures that the file(s) remains secured and can only be accessed by users who could use the file while it was inside the application.

Further, real-time federation of policies of the system of the present invention, with the application that generated the file ensures, that the permissions on the file always reflects the current permissions as per the new business scenario and the stage of the document in the business workflow when the file is used by any user. The system provides is federation of policies from multiple applications, simultaneously allows application to derive permission automatically, on the file at any point in time without having to define manually these permissions.

To achieve the same, the system uses one of the two approaches namely:

1. Set of web services (end-point) for policy federation is implemented as an independent component and questions application while the system of the present invention requests for file permission.

2. Set of web services (end-point) for policy federation can alternatively be implemented by the external application itself, wherein when the server of the system of the present invention requests the file permission, it just returns the same.

Thus, the system provides an automatic protection of file(s) and a real-time policy federation.

According to another embodiment of the present invention, an automatic protection of file(s) through system is achieved by intercepting download of file(s) or reports from the application and real time policy federation is achieved by using the two approaches mentioned above.

Other objects, features and advantages of the present invention will become apparent from the following description when taken in conjunction with the accompanying drawings wherein like characters of reference designate corresponding parts throughout the several views.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1A:
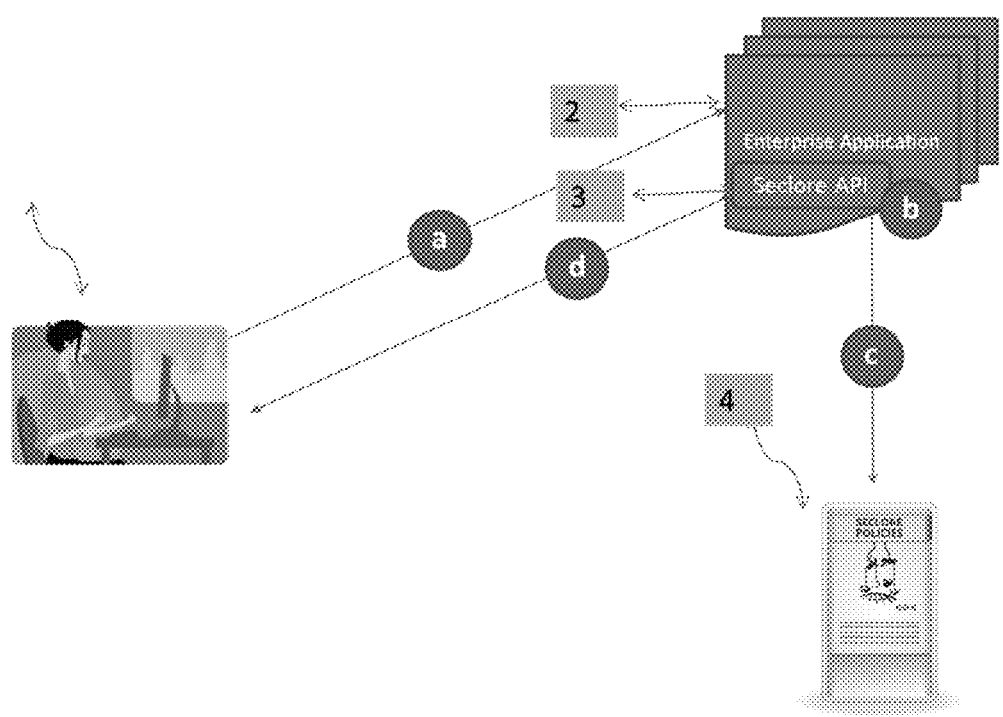
FIGS. 1a and 1b illustrate a schematic workflow of the automatic file protection on download of the system.

Before the present invention is described, it is to be understood that unless defined otherwise, all technical and scientific terms used herein have the same meaning as commonly understood by one of ordinary skill in the art to which this invention belongs. Further, it is to be understood that the present invention is not limited to the methodologies and materials similar, equivalent to those described herein can be used in the practice, or testing of the present invention, the preferred methods and materials are described, as these may vary within the specification indicated. Unless stated to the contrary, any use of the words such as "including," "containing," "comprising," "having" and the like, means "including without limitation" and shall not be construed to limit any general statement that it follows to the specific or similar items or matters immediately following it. Embodiments of the invention are not mutually exclusive, but may be implemented in various combinations. The described embodiments of the invention and the disclosed examples are given for the purpose of illustration rather than limitation of the invention as set forth the appended claims. Further, the terms disclosed embodiments are merely exemplary methods of the invention, which may be embodied in various forms.

According to the present invention, the solution envisioned through this embodiment is to provide a system for real time federation of file permissions for digital content protection. The system that automatically protects the file(s) as the file(s) leave application boundaries or ES and then ensures that the file(s) can only be used as per the permissions defined on that information while it was inside the application or ES. To achieve this, the system of the present invention, intercepts the download of file(s) or reports from the application.

The system of the present invention comprises:

1. Policy Server (4): A central server that communicates with the client software and the federated applications. It stores the details of the protected file. Whenever the client's application requests for permissions of a user on the file, it queries the relevant applications and returns the permissions to the client application.

2. Client application (1): A client side application that communicates with the policy server (4) to fetch permissions of a given user on a given document and enforces these permissions on the user when the user is trying to work with the document.

3. Application (2): Any desktop, server, or service software that stores or generates files from the digital content that needs to be secured is referred as application (2). The application (2) has knowledge of the policies that govern the access to such information. These policies are federated by the policy server when a user is trying to work with such confidential file.

4. Application connector (SECLORE Protect API) (3): This is software that connects any enterprise or applications or any individual application with policy server. It does one or more of the following:
   a. It protects the file(s) as they exit application boundary, and/or
   b. It helps policy server to fetch permissions of a given user on a given file by querying the application and translating the permissions defined in the application to permissions as understood by policy server.

Figure 1B:
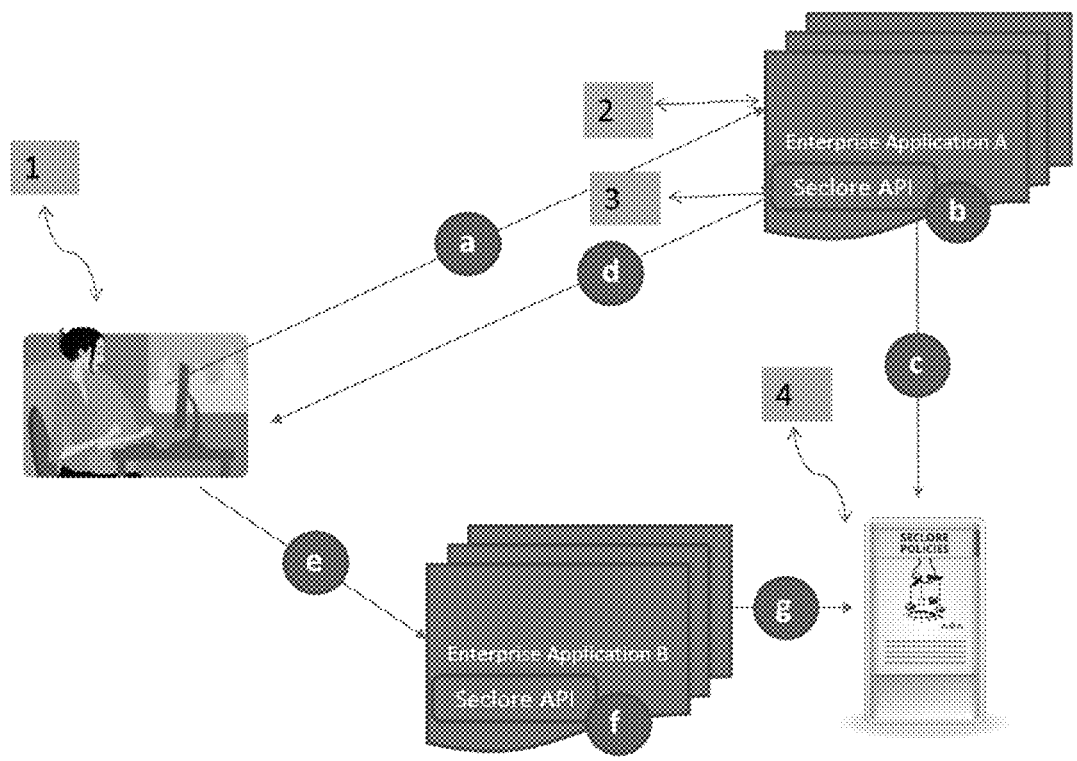

As illustrated in FIGS. 1a and 1b of the accompany drawings, the automation of file protection on download is achieved using the system of the present invention in following steps:

A. File protection on download, as illustrated in FIG. 1a
1. User requests a file download from application (2), for example, SharePoint, Box, Email servers, SAP, BI Tools, enterprise file shares.
2. The application (2) will inform the system of the present invention, i.e., application connector (3) with the details of file.
3. Application connector (3) will in-turn call system's policy server (4) for encryption details, protect the file and return success/failure to the application (2),
4. The application (2) will download the protected file to user's (1) machine.

B. File protection on download, as illustrated in FIG. 1b
1. User through client-application software (1) request a file download from application A (2).
2. The application (2) will call application connector (3) with the details of file.
3. Application connector (3) will in-turn call policy server (4) for encryption details, protect the file and return success/failure to the application (2).
4. The application (2) will download the protected file to user's machine (1).
5. User (1) then uploads or shares the file using application B (2).
6. The application (2) detects that it is a protected document and shares some more information of the file corresponding to application B with policy server (4) by calling application connector (3),
7. Policy server (4) stores this additional information with other file details.

Figure 1C:
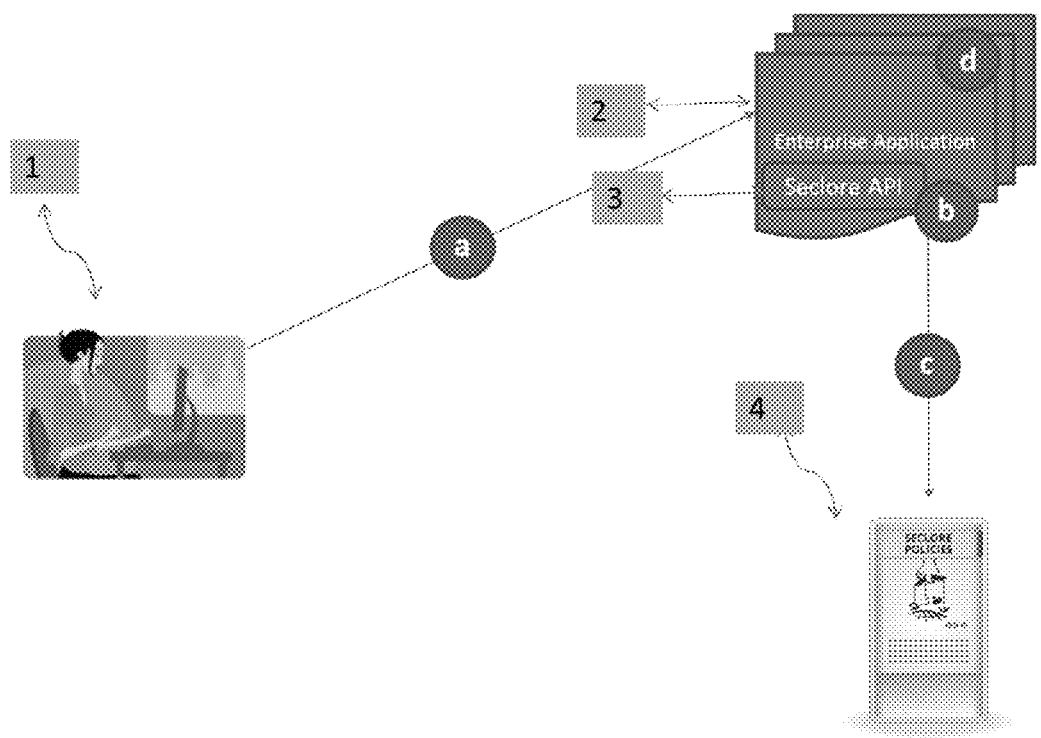
FIG. 1c illustrates a schematic workflow of the automatic file protection on upload of the system.

C. File protection on upload as illustrated in FIG. 1c
1. User (1) uploads a new file to application (2).
2. The application (2) will call application connector (3) with the details of file.
3. Application connector will in-turn call policy server (4) for encryption details and protects the file.
4. The application (2) will store the protected file in its database, and delete the unprotected copy (if any).

This can be further illustrated using the following example:
1. SharePoint: When a file is downloaded from SharePoint, the system of the present invention uses SharePoint API, to intercept the download on SharePoint server, and protects the file and further allowing the file to get downloaded to user's machine.
2. SAP: When a report is downloaded from SAP server, system of the present invention utilizes the SAP's API to intercept the download. As soon as the report file is generated on the server, it is secured on the system of the present invention, even before it is allowed to get downloaded. In cases where the reports are periodically mailed to users, the system of the present invention intercepts the process on the SAP server such that the file is protected before it is mailed.
3. BOX:
a) When the file is protected before it is uploaded to Box server. This is achieved by a client component running on the end user machine that monitors the Box sync folder and automatically protects file as they are dropped in the folder (see FIG. 3 of the accompany drawings).
b) When file is directly uploaded to Box server without using Box Sync then the system of the present invention uses Box API to capture this event and automatically protect the file in Box.

The system of the present invention ensures that the file remains secured and can only be used by users who could use the file while it was inside the application.

According to another embodiment of the present invention describes the real-time federation of policies of the system of the present invention, with the application that generated the file ensures, that the permissions on the file always reflects the current permissions on the file as per the new business scenario and the stage of the document in the business workflow when the file is used by any user.

Figure 2A:
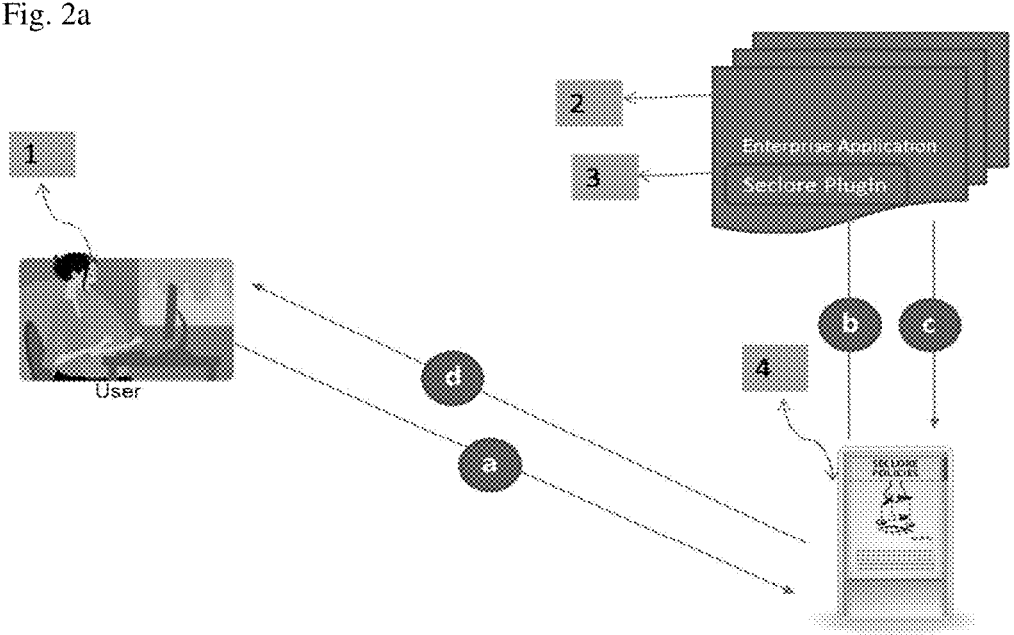
FIGS. 2a and 2b illustrate a schematic workflow of the policy federation.

Policy federation framework allows any application or PEAS to have complete control over the IRM ("Information Rights Management") access permissions. Further, instead of pre-defining and storing the permissions in IRM database at the time of protection, permissions are queried from the integrating application whenever a user is trying to open the file. This makes integrating application the single source of truth for file permissions. Integrating application needs to create web service end-points (with a pre-defined xml request and response structure) that the policy server will call for requesting permissions. To achieve the same, the system uses one of the two approaches namely:

1. Set of web services (end-point) for policy federation is implemented as an independent component and questions application while the system of the present invention requests for file permission.
2. Set of web services (end-point) for policy federation can alternatively be implemented by the external application itself, wherein when the server of the system of the present invention requests the file permission, it just returns the same. As illustrated in FIG. 2a of the accompanying drawings:
   1. Request will go from user (1) to policy server (3) when an authenticated user opens a protected file.
   2. Policy server (4) will call application's policy federation web service provided by application (2) with user details, to fetch user's permissions on the file. These permissions within the application (2) are translated to policy server permissions.
   3. Policy server (4) will pass these permissions to the user and file will open with appropriate permissions.

Figure 2B:
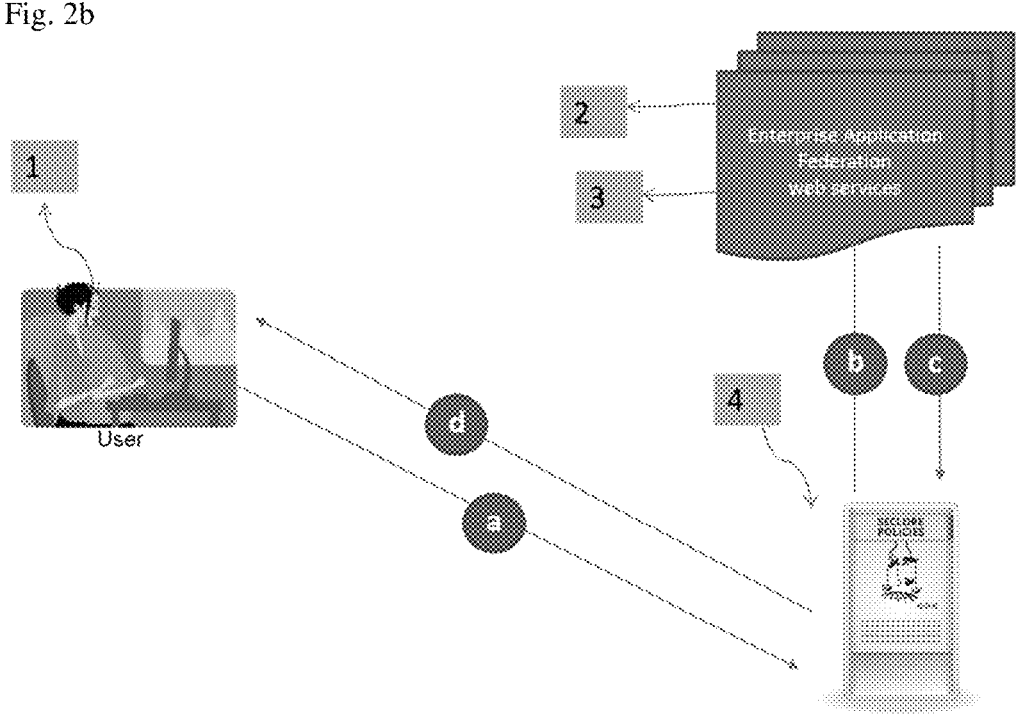

As illustrated in FIG. 2b of the accompanying drawings:
i. Request will go from client-application software (1) to policy server (4) when an authenticated user opens a protected file.
ii. Policy server (4) will call SECLORE plugin within the application (2) to fetch user's permissions on the file.
iii. Application connector (3) will fetch user's permissions within the application (2), translate them to policy server permissions and return them to policy server.
iv. Policy server will pass these permissions to the client on user's machine and file will open with appropriate permissions. This can be further illustrated using the following example:

1. SharePoint
i. When the file is protected in SharePoint server before download, the system of the present invention captures certain details of the file, e.g., unique ID of the file within SharePoint, folder in SharePoint where the file was present, etc. This information is captured and stored with the system's server.
ii. When a user tries to open the file, system's client on user's machine requests for user's permissions on the file from system's server. System's policy server internally fetches the user's permissions on the file in SharePoint. For this, it uses the information captured at the time of downloading the file from SharePoint.
iii. For fetching the user's permissions on the file in SharePoint, system of the present invention has written web service that runs on the SharePoint server. System's server calls this web service and passes all the details of the file. The web service fetches the user's permissions on the file in SharePoint and then converts those to system's permissions and returns the permissions.
iv. Based on the above, the system's policy server returns the permissions to system's client and the client opens the file with appropriate permissions or denies access if the user does not have any permissions on the file.

2. Box
i. When a file is protected, system capture certain file details like the file ID of the file in Box, the folder in which it was uploaded, the owner of the Boxfolder, etc.
ii. When the user tries to open the file, the system's client on user's machine requests for user's permissions from system's policy server.
iii. The policy server internally queries Box using Box API and the details of the file captured to find the user's permissions on the file in Box.
iv. It converts these permissions to system's permissions and returns them to system's client.
v. System's client then allows the user to open the file with those permissions or denies permissions if the user does not have any permissions on the file in Box.

Thus, the system provides an automatic protection of files and a real time policy federation.

Figure 3:
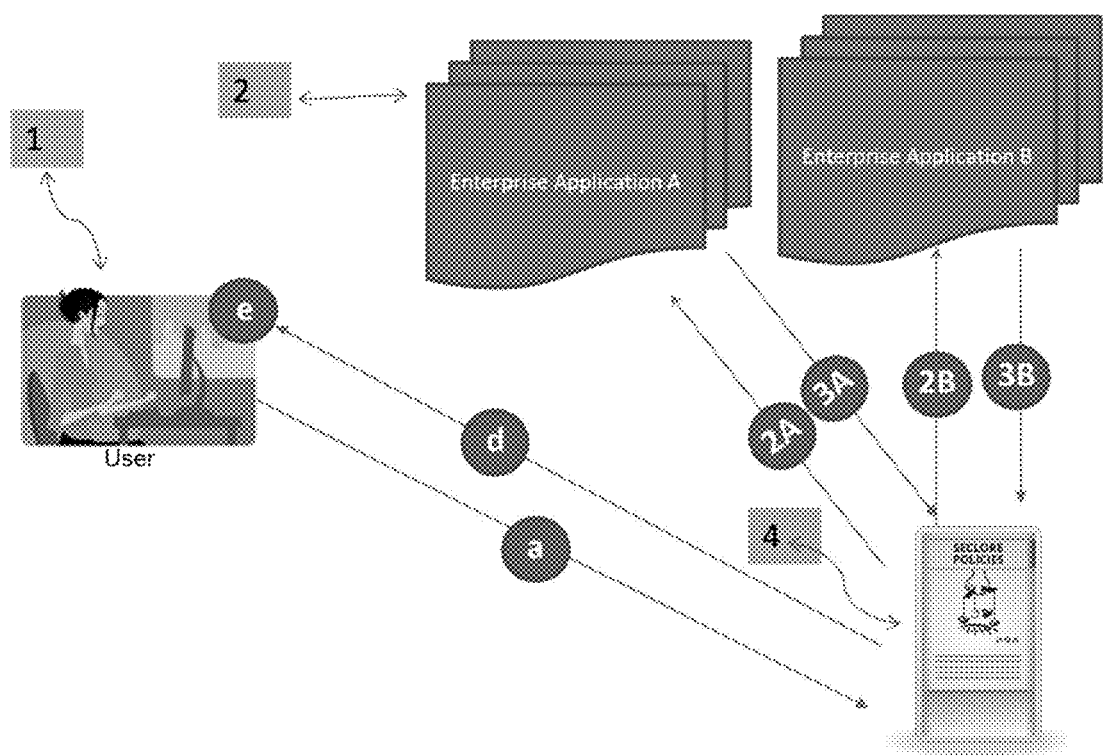
FIG. 3 illustrates a schematic workflow the system provides federating policies from multiple applications.

Yet in another embodiment of the present invention, the system provides is federation of policies from multiple applications, simultaneously allows applications to derive permission automatically, on the file at any point in time without having to define manually these permissions, as can be seen in FIG. 3 of the accompanying drawings.

1. Request will go from user (1) to policy server when an authenticated user opens a protected file,
2. Policy server will fetch user's permissions from multiple applications (2) to fetch user's permissions on the file.
3. These permissions within the application (2) are translated to policy server permissions.
4. Policy server will pass compute combined permission set and pass these permissions to the client on user's machine.
5. File will open with appropriate permissions on the user's machine.

Thus, the system of the present invention brings following advantages to the users of the system:

1. Securing application information even after it leaves the application boundaries.
2. Making sure that application information stays secured with the same permissions that govern the information while inside the application.
3. Not having to define different set of policies that govern access to the downloaded information. The application security policies automatically flow to the downloaded information.
4. Not having to maintain different set of policies in different systems to control access to the information.
5. Not having to manage another set of policies that control downloaded information when the permissions need to change as information flows through different workflows.
6. Not relying on another system or end user to secure the information getting downloaded from given application. The application can ensure that the information is always controlled by its own security policies.
7. By deriving policies from multiple applications, the document permissions get defined as it flows through different application workflows within any human intervention required to set policies on the document.

While considerable emphasis has been placed herein on the specific elements of the preferred embodiment, it will be appreciated that many alterations can be made and that many modifications can be made in preferred embodiment without departing from the principles of the invention. These and other changes in the preferred embodiments of the invention will be apparent to those skilled in the art from the disclosure herein, whereby it is to be distinctly understood that the foregoing descriptive matter is to be interpreted merely as illustrative of the invention and not as a limitation.

What is claimed is:

1. A system for real time federation of file permissions for digital content protection, comprising:
   a central server;
   a client software application operating on a first separate computing device remote from the central server;
   a plurality of permissions applications, each permissions application storing details of protected files forming the real time federation of file permissions, wherein each of the permissions applications operates on a computing device separate and remote from the central server; and
   a connector application, the connector application comprising a plurality of permissions application specific Application Programming Interfaces (APIs), each permissions application specific API corresponding to a single permissions application in the plurality of permissions applications;
   wherein:
   the central server communicates between the client software application and the plurality of permissions applications on which permissions are defined;
   whenever any request from the client software application is made for a permission of any user to access a protected file, the central server initially queries the permissions application and then, only if the user is authorized to access the protected file, returns the permission to the client software application, even if the protected file is outside an application boundary,
   the connector application is configured to protect the file as the file exits the application boundary to cause the protected file to send the request to the central server,
   protecting the file includes encrypting the file such that any attempt to open the file outside the application boundary causes a request for permission to access the file to be transmitted to the communication interface, which will in turn query an appropriate permissions application, and
   a federation of policies from multiple applications are delivered and the permissions application is simultaneously allowed to derive permissions automatically, on any file at any point in time without having to manually define the permissions.

2. The system of claim 1, wherein the client software application communicates with the central server to fetch permissions of any user on any specific given document from the real time federation of file permissions.

3. The system of claim 2, wherein the client software application enforces these permissions on the user when the user is trying to access the document even if the document is outside the application boundary.

4. The system of claim 1, wherein the connector application is a software program that connects to the permissions application with the central server.

5. The system of claim 1, wherein the connector application is configured to assist the central server to fetch permissions of any given user on any given file by querying the permissions application and translating the permissions defined in the permissions application to permissions as understood by the central server.

6. A system comprising:
   a processor;
   memory;
   a client software application;
   a plurality of permissions applications, each permissions application storing details of protected files forming the real time federation of file permissions;
   a connector application, the connector application comprising a plurality of permissions application specific Application Programming Interfaces (APIs), each permissions application specific API corresponding to a single permissions application in the plurality of permissions applications;
   a communication interface configured to communicate between the client software application and the plurality of permissions applications on which permissions are defined; and
   wherein;
   whenever any request from the client software application is made for a permission of any user to access a protected file, the communication interface initially queries the permissions application and then, only if the user is authorized to access the protected file, returns the permission to the client software application, even if the protected file is outside an application boundary,
   the connector application is configured to protect the file as the file exits the application boundary to cause the protected file to send the request to the central server,
   protecting the file includes encrypting the file such that any attempt to open the file outside the application boundary causes a request for permission to access the file to be transmitted to the communication interface, which will in turn query an appropriate permissions application, and
   a federation of policies from multiple applications are delivered and the permissions application is simultaneously allowed to derive permissions automatically, on any file at any point in time without having to manually define the permissions.

7. The system of claim 6, wherein the client software application communicates with the communication interface to fetch permissions of any user on any specific given document from the real time federation of file permissions.

8. The system of claim 7, wherein the client software application enforces these permissions on the user when the user is trying to access the document even if the document is outside the application boundary.

9. The system of claim 6, wherein the connector application is a software program that connects to the permissions application with the communication interface.

10. The system of claim 6, wherein the connector application is configured to assist the communication interface to fetch permissions of any given user on any given file by querying the permissions application and translating the permissions defined in the permissions application to permissions as understood by the communication interface.

11. A server comprising:
    a processor;
    memory;
    a connector application comprising a plurality of permissions application specific Application Programming Interfaces (APIs), each permissions application specific API corresponding to a single permissions application in a plurality of permissions applications; and
    a communications interface, the communication interface configured to communicate between a client software application a first computing device and a permissions application on a second computing device;
    wherein;
    whenever any request from the client software application is made for the a permission of any user to access a protected file, the server initially queries the permissions application and then, only if the user is authorized to access the protected file, returns the permission to the client software application, even if the protected file is outside the an application boundary, the connector application is configured to protect the file as the file exits the application boundary to cause the protected file to send the request to the central server, protecting the file includes encrypting the file such that any attempt to open the file outside the application boundary causes a request for permission to access the file to be transmitted to the communication interface, which will in turn query an appropriate permissions application, and a federation of policies from multiple applications are delivered and the permissions application is simultaneously allowed to derive permissions automatically, on any file at any point in time without having to manually define the permissions.

12. The server of claim 11, wherein the client software application communicates with the server to fetch permissions of any user on any specific given document from a real time federation of file permissions and enforces these permissions on the user when the user is trying to access the document even if the document is outside the application boundary.

13. The server of claim 11, wherein the connector application is a software program that connects to the permissions application with the server.

14. The server of claim 11, wherein the connector application is configured to assist the server to fetch permissions of any given user on any given file by querying the permissions application and translating the permissions defined in the permissions application to permissions as understood by the server.

15. The server of claim 11, wherein a federation of policies from multiple applications are delivered and the permissions application is simultaneously allowed to derive permissions automatically, on any file at any point in time without having to manually define the permissions.

* * * * *